US008593597B2

(12) United States Patent
Mitsumoto et al.

(10) Patent No.: US 8,593,597 B2
(45) Date of Patent: Nov. 26, 2013

(54) ACTIVE MATRIX SUBSTRATE AND DISPLAY DEVICE HAVING THE SAME

(75) Inventors: Kazuyori Mitsumoto, Osaka (JP); Masahiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 64 days.

(21) Appl. No.: 13/255,160

(22) PCT Filed: Feb. 23, 2010

(86) PCT No.: PCT/JP2010/001194
§ 371 (c)(1),
(2), (4) Date: Sep. 7, 2011

(87) PCT Pub. No.: WO2010/137206
PCT Pub. Date: Dec. 2, 2010

(65) Prior Publication Data
US 2012/0019750 A1    Jan. 26, 2012

(30) Foreign Application Priority Data

May 29, 2009  (JP) .................................. 2009-131310

(51) Int. Cl.
*G02F 1/1335*  (2006.01)
(52) U.S. Cl.
USPC ........... 349/113; 349/114; 349/138; 349/139; 349/143; 349/144
(58) Field of Classification Search
USPC ......... 349/41, 42, 56, 67, 113, 114, 138, 139, 349/143, 144, 149, 158
See application file for complete search history.

(56) References Cited

U.S. PATENT DOCUMENTS

| 5,798,812 | A | 8/1998 | Nishiki et al. |
| 7,339,567 | B2 * | 3/2008 | Yasukawa ........................ 345/90 |
| 8,208,101 | B2 * | 6/2012 | Yasukawa ...................... 349/113 |
| 2006/0250548 | A1 * | 11/2006 | Yasukawa ...................... 349/113 |
| 2008/0117376 | A1 | 5/2008 | Takenaka |
| 2009/0033855 | A1 | 2/2009 | Kaneko et al. |
| 2009/0073364 | A1 * | 3/2009 | Matsuno ........................ 349/138 |
| 2012/0019750 | A1 * | 1/2012 | Mitsumoto et al. ........... 349/113 |

FOREIGN PATENT DOCUMENTS

| CN | 101359139 A | 2/2009 |
| JP | 9-90397 | 4/1997 |
| JP | 10-20339 | 1/1998 |
| JP | 10-153770 | 6/1998 |
| JP | 11-24101 | 1/1999 |
| JP | 11-153809 | 6/1999 |
| JP | 2000-2887 | 1/2000 |
| JP | 2001-272685 | 10/2001 |
| KR | 10-2008-0046553 A | 5/2008 |

OTHER PUBLICATIONS

International Search Report for PCT/JP2010/001194, mailed Jun. 1, 2010.

* cited by examiner

*Primary Examiner* — Jennifer Doan
(74) *Attorney, Agent, or Firm* — Nixon & Vanderhye P.C.

(57) ABSTRACT

The active matrix substrate includes: a plurality of switching elements provided on an insulating substrate; a plurality of lines provided on the insulating substrate and connected to the switching elements; an interlayer insulating film covering the switching elements and the lines; a plurality of pixel electrodes formed on the interlayer insulating film; and a plurality of terminals connected to the lines and placed with a predetermined spacing. At least part of each of the terminals is not covered with the interlayer insulating film. A reflection layer configured to reflect light is provided in a region that is at least part of each gap between the adjacent terminals and includes an edge of the interlayer insulating film, as viewed from the normal to the surface of the insulating substrate.

13 Claims, 10 Drawing Sheets

ACTIVE MATRIX SUBSTRATE AND DISPLAY DEVICE HAVING THE SAME

This application is the U.S. national phase of International Application No. PCT/JP2010/001194 filed 23 Feb. 2010 which designated the U.S. and claims priority to JP Patent Application No. 2009-131310 filed 29 May 2009, the entire contents of each of which are hereby incorporated by reference.

TECHNICAL FIELD

The present disclosure relates to an active matrix substrate and a display device having the same.

BACKGROUND ART

It is conventionally known that an active matrix substrate having a plurality of switching elements such as thin film transistors (TFTs) formed on a glass substrate is used for display devices such as a liquid crystal display device, an organic EL display device, and an electrophoresis display device.

In general, in display devices having an active matrix substrate, pixel electrodes are formed in the uppermost layer of the active matrix substrate to increase the aperture ratio of the display screen.

More specifically, a plurality of TFTs, gate lines, source lines, etc. are formed on a glass substrate of the active matrix substrate, and an interlayer insulating film is formed covering the TFTs, the lines, etc. Pixel electrodes are then formed on the surface of the interlayer insulating film.

Having the above configuration, the pixel electrodes on the interlayer insulating film can be formed to spread even to above the gate lines and the source lines, permitting increase in the area of the pixel electrodes. Also, by forming a thick interlayer insulating film by spin coating, it is possible to reduce the parasitic capacitance between the pixel electrodes and the gate and source lines. In this way, a liquid crystal display device that can suppress or reduce generation of crosstalk and has a large aperture ratio can be implemented.

In a peripheral region of the active matrix substrate, an end of the interlayer insulating film exists, and also a plurality of terminals are formed at ends of the lines. To these terminals, which are placed side by side with a predetermined spacing, an IC driver and an external circuit board such as a flexible printed circuit (FPC) are to be mounted.

At an end of the interlayer insulating film, a large step is formed on the glass substrate. Therefore, in the neighborhood of the end of the interlayer insulating film, a resist for patterning the pixel electrodes is likely to fail in sufficient light exposure, causing generation of residues. As a result, residues of a pixel electrode material may be left under such resist residues, and cause short-circuiting between adjacent terminals.

To solve the above problem, Patent Document 1 discloses formation of an organic thin film pattern between terminals. With such an organic thin film pattern, portions of a pixel electrode material located on this pattern can be etched fast, leaving no residue of the pixel electrode material between the terminals.

Patent Document 2 discloses formation of the same insulating film as the interlayer insulating film between terminals. Patent Document 3 discloses a technique where an insulating film for short-circuit prevention covering terminals is formed along an end of an interlayer insulating film.

Patent Document 4 discloses a technique where, while a resist is subjected to excessive light exposure to ensure no resist residue left behind, reflection of the light by lines after having passed through the resist is reduced, thereby to form pixel electrodes properly.

Patent Document 5 discloses a technique where the boundary at an end of an interlayer insulating film has pits and projections as viewed from the normal to the substrate surface, thereby to obtain a mild tilt angle at the end of the interlayer insulating film, and thus suppress or reduce generation of resist residues.

Patent Document 6 discloses an active matrix substrate which, as shown in a plan view of FIG. 18, includes: a gate insulating film 101 formed on a glass substrate; a plurality of terminals 102 placed on the gate insulating film with a predetermined spacing; and an interlayer insulating film 103 formed on the gate insulating film 101 to cover part of the terminals 102.

Projections 104 are formed from an end of the interlayer insulating film 103 to protrude to the gaps between the terminals 102. The tilt angle of the projections 104 with respect to the surface of the glass substrate is smaller than the tilt angle of the projection-free portions of the end of the interlayer insulating film 103. With this configuration, it is intended to ensure no resist residue left on the projections 104, thereby to prevent short-circuiting between the terminals 102 due to a resist residue.

CITATION LIST

Patent Document

PATENT DOCUMENT 1: Japanese Patent Publication No. H09-90397
PATENT DOCUMENT 2: Japanese Patent Publication No. H10-153770
PATENT DOCUMENT 3: Japanese Patent Publication No. H10-20339
PATENT DOCUMENT 4: Japanese Patent Publication No. 2000-2887
PATENT DOCUMENT 5: Japanese Patent Publication No. H11-153809
PATENT DOCUMENT 6: Japanese Patent Publication No. H11-24101

SUMMARY OF THE INVENTION

Technical Problem

Patent Document 6 mentioned above describes examples of the projections 104: projections having a width of 70 μm and a protruding length of 50 μm and projections having a width of 20 μm and a protruding length of 30 μm. However, formation of the projections 104 having such sizes will be difficult when the active matrix substrate is used for small-size display devices capable of high-resolution display.

For example, in an active matrix substrate that constitutes a 16.4-inch liquid crystal display device capable of full HD display (resolution: 1920×1080) and to which an FPC is mounted, the pitch of source terminals is 25 μm, and the spacing between the source terminals is 13 μm, which is very narrow. Also, in a COG-mounted active matrix substrate that constitutes a 3-inch wide QVGA liquid crystal display device, the pitch of gate terminals and source terminals is 17 μm, and the spacing between these terminals is 13 μm, which is very narrow.

Also, when an FPC is mounted to the terminals, the projections 104, which are comparatively thick, may obstruct the mounting, making it difficult for terminals of the FPC to come into contact with the terminals of the substrate.

In view of the problems described above, it is an objective of the present disclosure to suppress or reduce short-circuiting between terminals and facilitate connection of an external circuit to the terminals.

Solution to the Problem

To attain the above objective, The active matrix substrate of the present disclosure includes: an insulating substrate; a plurality of switching elements provided on the insulating substrate; a plurality of lines provided on the insulating substrate and connected to the switching elements; an interlayer insulating film covering the plurality of switching elements and the plurality of lines; a plurality of pixel electrodes formed on the interlayer insulating film; and a plurality of terminals connected to the plurality of lines and placed with a predetermined spacing, wherein at least part of each of the plurality of terminals is not covered with the interlayer insulating film, and a reflection layer configured to reflect light in a direction opposite to the insulating substrate is provided in a region that is at least part of each gap between the adjacent terminals and includes an edge of the interlayer insulating film, as viewed from the normal to the surface of the insulating substrate.

The reflection layer may be placed independently in each gap between the adjacent terminals.

The reflection layer may be formed to extend astride each of the terminals in a width direction of the terminal.

Preferably, the reflection layer is made of a metal layer.

An external circuit may be connected to the plurality of terminals.

The display device of the present disclosure includes: an active matrix substrate; a counter substrate opposed to the active matrix substrate; and a display medium layer provided between the active matrix substrate and the counter substrate, wherein the active matrix substrate includes an insulating substrate, a plurality of switching elements provided on the insulating substrate, a plurality of lines provided on the insulating substrate and connected to the switching elements, an interlayer insulating film covering the plurality of switching elements and the plurality of lines, a plurality of pixel electrodes formed on the interlayer insulating film, and a plurality of terminals connected to the plurality of lines and placed with a predetermined spacing, at least part of each of the plurality of terminals is not covered with the interlayer insulating film, and a reflection layer configured to reflect light in a direction opposite to the insulating substrate is provided in a region that is at least part of each gap between the adjacent terminals and includes an edge of the interlayer insulating film, as viewed from the normal to the surface of the insulating substrate.

The reflection layer may be placed independently in each gap between the adjacent terminals The reflection layer may be formed to extend astride each of the terminals in a width direction of the terminal.

Preferably, the reflection layer is made of a metal layer.

An external circuit may be connected to the plurality of terminals.

The display medium layer may be a liquid crystal layer.

Function

The function of the present disclosure will be described.

In fabrication of the active matrix substrate described above, first, a plurality of switching elements and a plurality of lines are formed on an insulating substrate. Also, a plurality of terminals, connected to the lines, are placed on the insulating substrate with a predetermined spacing.

A reflection layer that reflects light is formed in a region that is at least part of each gap between the adjacent terminals and includes an edge of an interlayer insulating film, as viewed from the normal to the surface of the insulating substrate. The reflection layer can be made of a metal layer, for example. Such a reflection layer can be easily thinned, and thus can be formed into a fine shape with high precision by photolithography.

Thereafter, the interlayer insulating film covering the switching elements and the lines is formed on the insulating substrate. This formation is made so that at least part of each of the terminals is not covered with the interlayer insulating film.

Pixel electrodes can be formed on the interlayer insulating film by photolithography. In this case, a pixel electrode material is formed on the insulating substrate uniformly to cover the interlayer insulating film. A resist is then formed to cover the pixel electrode material, and exposed to light via a photomask. By removing exposed regions, a mask is formed from the resist, which has openings corresponding to regions in which no pixel electrode is formed. Thereafter, portions of the pixel electrode material not covered with the mask are removed by etching, etc., to form the pixel electrodes in a predetermined shape on the interlayer insulating film.

According to the present disclosure, the resist that may be thick in a region near an edge of the interlayer insulating film can be sufficiently exposed to light with the existence of the reflection layers in this region because the reflection layers reflect exposure light having passed through the resist.

Fine reflection layers having a width as small as several micrometers, for example, can be formed by photolithography, for example. Therefore, even when the spacing between the terminals is comparatively narrow, the reflection layers can be formed between the terminals with high precision. Moreover, since the reflection layers can be thinned to about 0.1 to 0.5 µm, for example, an external circuit, when mounted, will be easily connected to the terminals without interfering with the reflection layers.

Thus, in the regions where the reflection layers are provided, generation of resist residues is prevented, and thus generation of residues of the pixel electrode material is prevented. As a result, short-circuiting between the terminals is suppressed or reduced.

Advantages of the Invention

According to the present disclosure, a reflection layer is formed in a region that is at least part of each gap between the adjacent terminals and includes an edge of the interlayer insulating film, as viewed from the normal to the surface of the insulating substrate. Therefore, with the existence of such reflection layers, generation of resist residues can be prevented, and thus generation of residues of the pixel electrode material can be prevented, in the neighborhood of the edge of the interlayer insulating film. As a result, short-circuiting between the terminals can be suppressed or reduced, and also connection of an external circuit to the terminals can be facilitated.

DESCRIPTION OF EMBODIMENTS

Embodiments of the present disclosure will be described hereinafter with reference to the drawings. Note however that the present disclosure is not limited to the embodiments to follow.

First Embodiment

FIGS. 1-7 show the first embodiment of the present disclosure.

Figure 1:
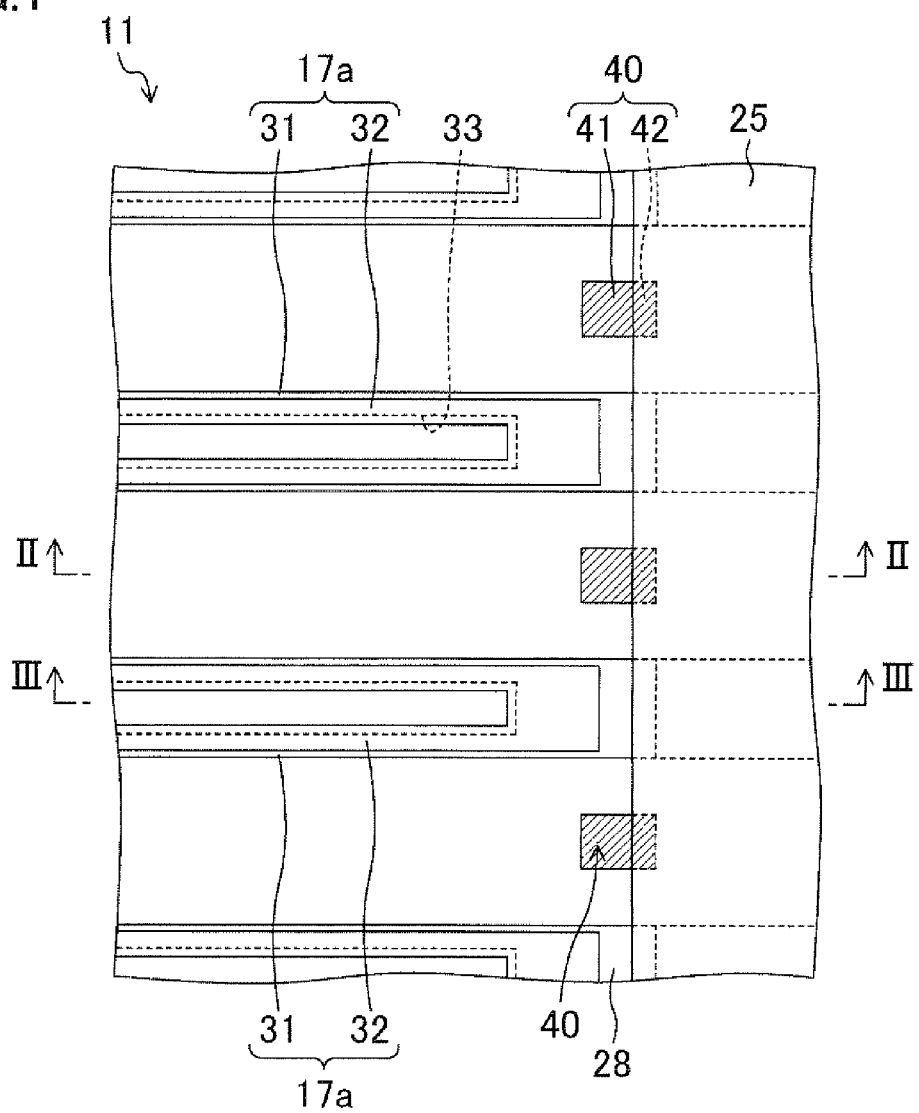
FIG. 1 is an enlarged plan view of part of a TFT substrate of the first embodiment.
Figure 2:
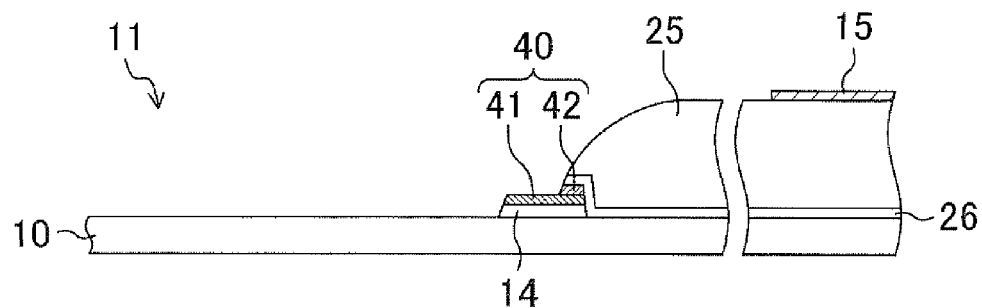
FIG. 2 is a cross-sectional view taken along line II-II in FIG. 1.
Figure 3:
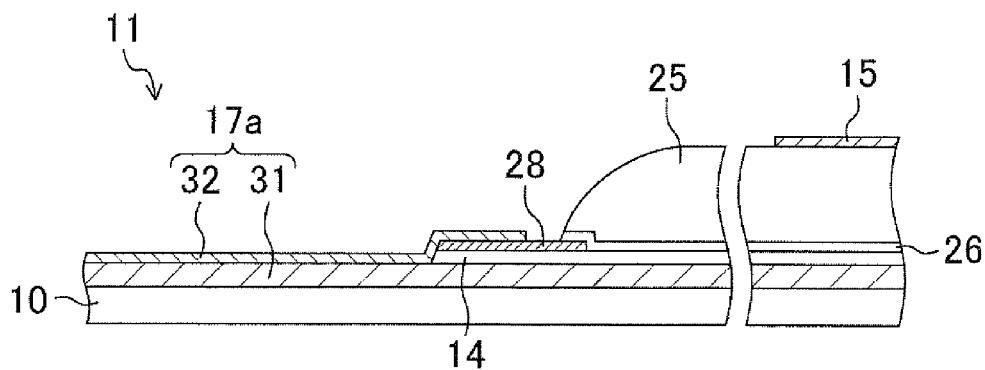
FIG. 3 is a cross-sectional view taken along line III-III in FIG. 1.
Figure 4:
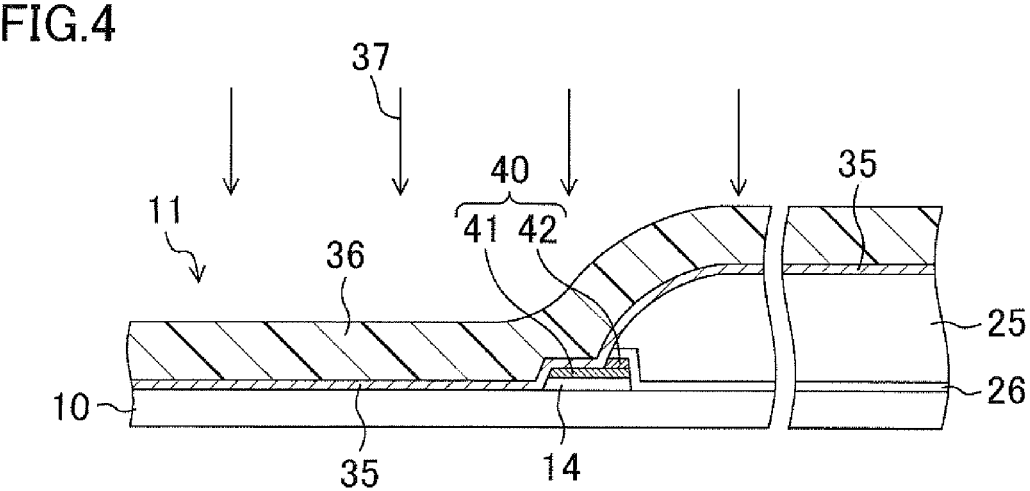
FIG. 4 is a cross-sectional view showing a resist being exposed to light.
Figure 5:
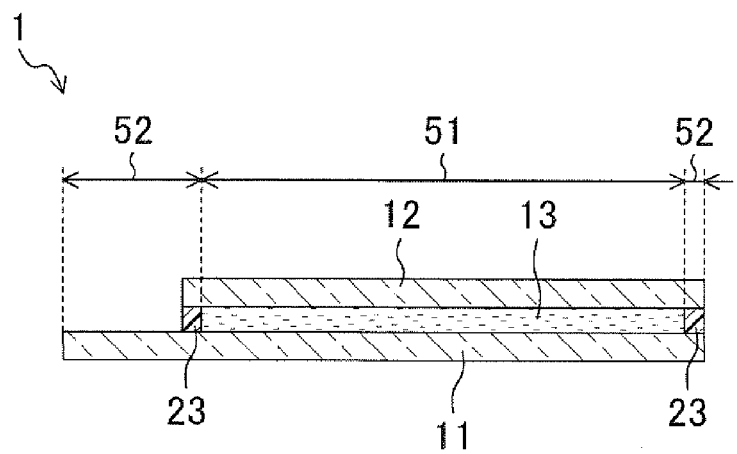
FIG. 5 is a cross-sectional view showing a schematic structure of a liquid crystal display device of the first embodiment.
Figure 6:
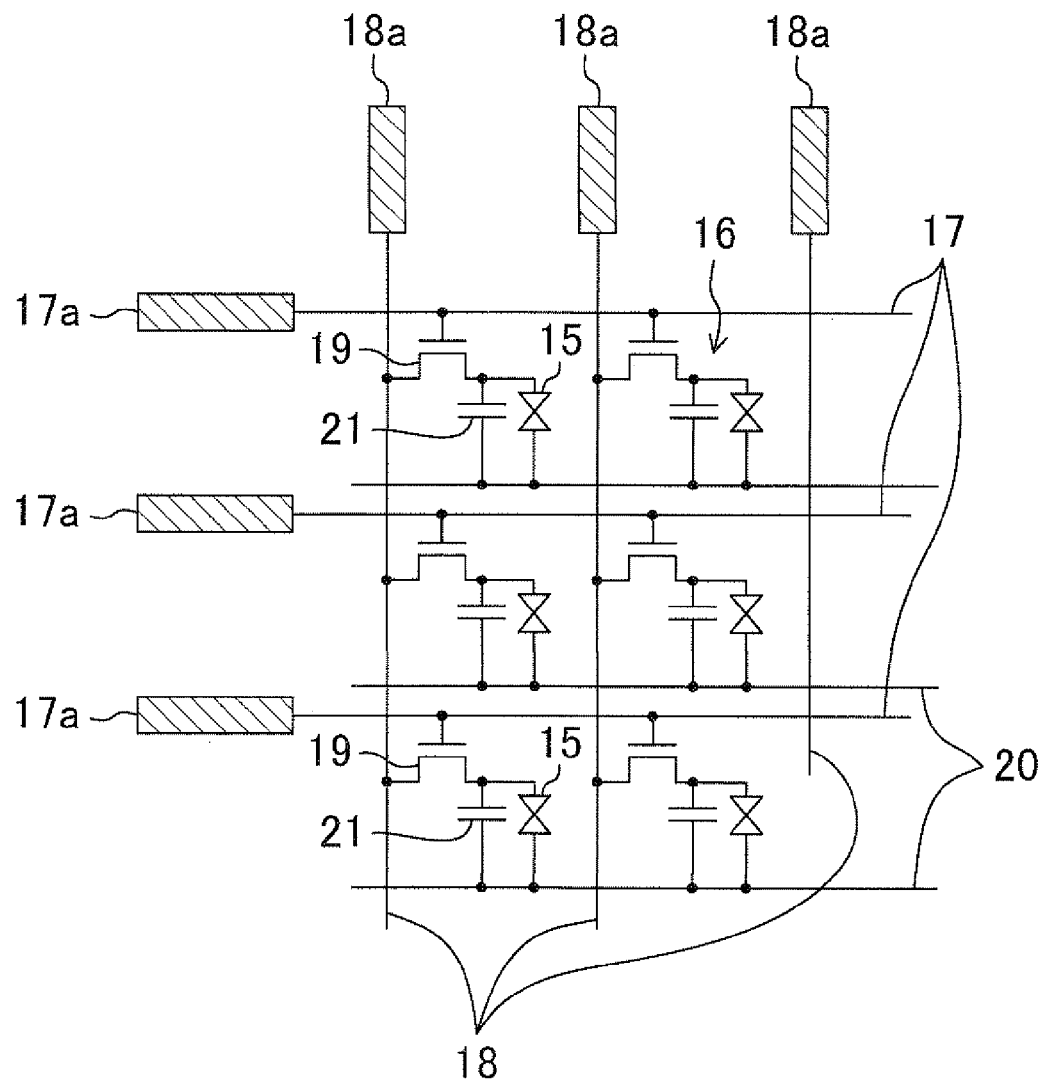
FIG. 6 is a circuit diagram of the TFT substrate of the first embodiment.
Figure 7:
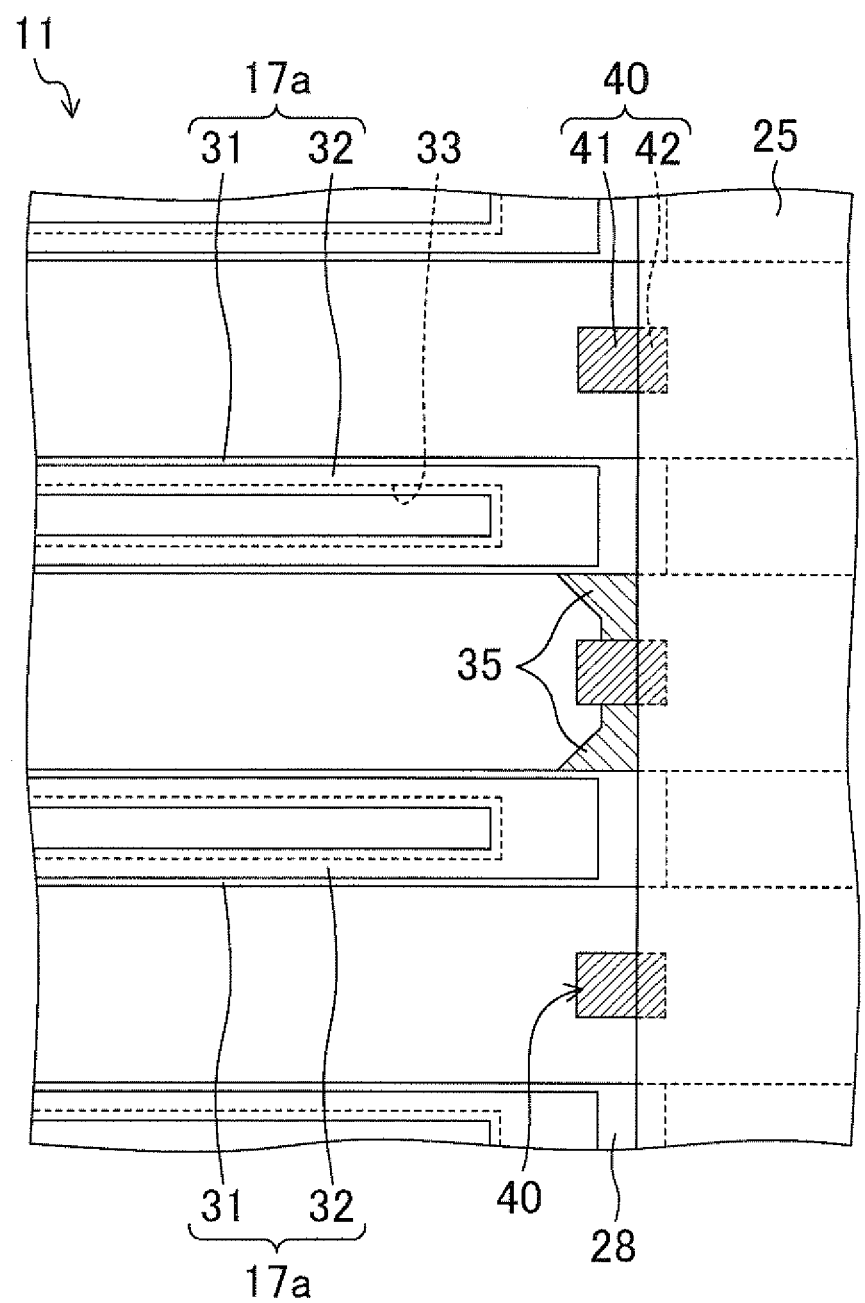
FIG. 7 is a plan view of a pixel electrode material partitioned at a position above a reflection layer.

FIG. 1 is an enlarged plan view of part of a TFT substrate of this embodiment. FIG. 2 is a cross-sectional view taken along line II-II in FIG. 1. FIG. 3 is a cross-sectional view taken along line III-III in FIG. 1. FIG. 4 is a cross-sectional view showing a resist being exposed to light. FIG. 5 is a cross-sectional view showing a schematic structure of a liquid crystal display device of the first embodiment. FIG. 6 is a circuit diagram of the TFT substrate of the first embodiment. FIG. 7 is a plan view of a pixel electrode material partitioned at a position above a reflection layer.

In this embodiment, a liquid crystal display device is taken as an example of the display device of the present disclosure.

As shown in FIG. 5, a liquid crystal display device 1 includes: a TFT substrate 11 as the active matrix substrate; a counter substrate 12 opposed to the TFT substrate 11; and a liquid crystal layer 13 as the display medium layer provided between the TFT substrate 11 and the counter substrate 12.

The counter substrate 12 includes color filters, a common electrode, a black matrix, etc. although illustration of these elements is omitted. The liquid crystal layer 13 is sealed by a frame-shaped sealant 23 placed between the TFT substrate 11 and the counter substrate 12.

The TFT substrate 11 includes a glass substrate 10 that is an insulating substrate as shown in FIGS. 2 and 3, and has a plurality of pixels 16 arranged in a matrix as shown in FIG. 6. A thin film transistor (TFT) 19 that is a switching element is formed on the glass substrate 10 for each of the pixels 16. A plurality of gate lines 17 and a plurality of source lines 18, connected to the TFTs 19, are also formed on the glass substrate 10.

The gate lines 17 extend in parallel with each other. Capacitor lines 20 are also formed on the glass substrate 10, to extend between the gate lines 17 in parallel with the gate lines 17, as viewed from the normal to the substrate surface. The gate lines 17 and the capacitor lines 20 are covered with a gate insulating film 14.

The source lines 18, formed on the gate insulating film 14, extend in parallel with each other and intersect the gate lines 17. In other words, the interconnects including the gate lines 17 and the source lines 18 form a lattice shape as a whole. The pixels 16 are formed in the lattice-shaped region. The TFTs 19 are connected to the gate lines 17 and the source lines 19.

On the glass substrate 10, formed also are a protection film 26 and an interlayer insulating film 25, which cover the gate lines 17, the source lines 18, the capacitor lines 20, and the TFTs 19. The protection film 26 is made of an inorganic film, for example, and the interlayer insulating film 25 made of an organic film, for example, is formed on the surface of the protection film 26 to a comparative large thickness (e.g., about 1 to 4 µm). The protection film 26 is not necessarily essential.

On the interlayer insulating film 25, formed are a plurality of pixel electrodes 15 configured to apply a voltage to the liquid crystal layer 13 for driving. The pixel electrodes 15, each provided for each pixel 16, are connected to the TFTs 19 via contact holes formed through the interlayer insulating film 25. The pixel electrodes 15 are formed of a transparent conductive film made of indium tin oxide (ITO), indium zinc oxide (ILO), etc., for example. The pixel electrodes 15 overlap the interconnects (gate lines 17 and source lines 18) surrounding the pixel electrodes 15 as viewed from the normal to the substrate surface.

Capacitor elements 21, also referred to as storage capacitors, are formed in regions where the pixel electrodes 15 overlie the capacitor lines 20. The capacitor elements 21, each provided for each pixel 16, serve to keep the display voltage at the pixels 16 constant.

As shown in FIG. 5, the TFT substrate 11 has a display region 51 where the pixels 16 are formed and a non-display region 52 surrounding the display region 51. In the non-display region 52, as shown in FIG. 6, a plurality of gate terminals 17a connected to the gate lines 17 are placed with a predetermined spacing, and a plurality of source terminals 18a connected to the source lines 18 are placed with a predetermined spacing.

The gate and source terminals 17a and 18a may be formed of any of the same material as the gate lines 17 and the same material as the source lines 18.

Output terminals (not shown) of a source driver as an external circuit are connected to the source terminals 18a via an anisotropic conductive film (ACF), and similarly, output terminals (not shown) of a gate driver as an external circuit are connected to the gate terminals 17a via an ACF.

At least part of each of the gate terminals 17a and the source terminals 18a is not covered with the interlayer insulating film 25. In other words, as shown in FIGS. 1-3, the ends of the interlayer insulating film 25 run across the gate terminals 17a and the source terminals 18a as viewed from the normal to the surface of the glass substrate 10. Also, the interlayer insulating film 25, which is comparatively thick, forms a step on the glass substrate 10.

As shown in FIGS. 1 and 3, each of the gate terminals 17a includes a first pad 31 formed on the glass substrate 10 and a second pad 32 partly formed on the first pad 31.

The first pad 31 is made of the same material as the gate lines 17, such as a metal layer having Ti, Al, and TiN layered in this order, a metal layer having Cr or Mo and Al or an Al-containing alloy layered in this order, or a single-layer metal layer of Al or an Al-containing alloy. The second pad 32 is made of the same material as the pixel electrodes 15, such as ITO.

As shown in FIGS. 2 and 3, the gate insulating film 14 is formed on the glass substrate 10 to cover the first pad 31. The gate insulating film 14 has a contact slit 33 formed therethrough, as shown in FIG. 1, to extend on the first pad 31 along the first pad 31. The second pad 32 formed on the gate insulating film 14 comes into contact with the first pad 31 via the contact slit 33.

A first semiconductor layer 28 is formed on the gate insulating film 14 in a region including the edge of the interlayer insulating film 25. A portion of the protection film 26 rises from the gate insulating film 14 to sit on the surface of the first semiconductor layer 28. As shown in FIG. 3, the sidewalls of the protection film 26 and the interlayer insulating film 25 constitute one continuous sidewall as a whole.

The second pad 32 rises at its end from the first pad 31 to sit on the first semiconductor layer 28 at the end opposite to the end on which the protection film 26 sits. The spacing between the second pad 32 and the interlayer insulating film 25 is about several micrometers to several tens of micrometers.

As a feature of the present disclosure, as shown in FIGS. 1 and 2, a reflection layer 40 that reflects light in the direction opposite to the glass substrate 10 is provided in a region that is at least part of each gap between the adjacent gate terminals 17a and includes the edge of the interlayer insulating film, as viewed from the normal to the surface of the glass substrate 10.

The reflection regions 40 in the first embodiment are made of the same material as the source lines 18, and placed independently between the adjacent gate terminals 17a. In other words, the reflections regions 40 are placed so as not to overlap the gate terminals 17a. Such reflection regions 40 placed between the gate terminals 17a will be described hereinafter.

As shown in FIG. 2, the gate insulating film 14 is formed on the glass substrate 10 in regions between the gate terminals 17a and partly underlies the interlayer insulating film 25. Each of the reflection layers 40 includes a first metal layer 41 formed on the surface of the gate insulating film 14 and a second metal layer 42 formed on a portion of the surface of the first metal layer 41. The first metal layer 41 is made of a Ti layer, for example, and the second metal layer 42 is made of an Al layer, for example.

The second metal layer 42 is formed on the portion of the surface of the first metal layer 41 underlying the interlayer insulating film 25. A portion of the protection film 26 rises from the glass substrate 10 to sit on the surface of the second metal layer 42. Thus, as shown in FIG. 2, the sidewalls of the second metal layer 42, the protection film 26, and the interlayer insulating film 25 constitute one continuous sidewall as a whole.

The second metal layer 42 is not necessarily essential, but only the first metal layer 41 may be provided. The first metal layer 41 may be a metal layer having Cr or Mo and Al or an Al-containing alloy layered in this order, or a single-layer metal layer made of Al or an Al-containing alloy. It is preferred to place the Al layer high in reflectivity as the uppermost layer from the standpoint of further enhancing the reflection effect of the reflection layer 40.

The reflection layers 40 are thus formed in a layer difference from the layer of the first pads 31.

Fabrication Method

Next, a method for fabricating the liquid crystal display device 1 having the TFT substrate 11 will be described.

The liquid crystal display device 1 is fabricated by bonding the TFT substrate 11 and the counter substrate 12, which are fabricated in advance, together via the liquid crystal layer 13 and the sealant 23.

In fabrication of the TFT substrate 11, first, the TFTs 19 and the lines 17, 18, and 20 are formed on the glass substrate 10 by photolithography. More specifically, the gate lines 17 and the first pads 31 of the gate terminals 17a are placed on the surface of the glass substrate 10 with a predetermined spacing. Layers of Ti, Al, and TiN, for example, are stacked one upon another in this order to form the gate lines 17 and the first pads 31.

The gate insulating film 14 is then formed on the glass substrate 10 to cover the gate lines 17 and part of each of the first pads 31. Thereafter, as shown in FIG. 3, the first semiconductor layers 28 are formed on ends of portions of the gate insulating film 14 covering the first pads 31 by photolithography and etching.

Meanwhile, as shown in FIG. 2, the reflection layers 40 are formed on portions of the gate insulating film 14 lying between the adjacent first pads 31, simultaneously with the source lines 18 in the same process. The first metal layers 41 of the reflection layers 40 are formed as islands by subjecting a Ti layer, for example, to photolithography and etching.

Thereafter, Al layers, for example, constituting the second metal layers 42 are formed on the first metal layers 41. An inorganic film constituting the protection film 26 and an organic film constituting the interlayer insulating film 25 are then deposited to cover the Al layers and the first semiconductor layers 28. The Al layers, the inorganic film, and the organic film are then patterned by photolithography and etching.

By the above patterning, the second metal layers 42, the protection film 26, and the interlayer insulating film 25 are formed. As a result, as shown in FIG. 1, the interlayer insulating film 25 has an edge crossing the gate terminals 17a, and the first pads 31, part of each of the first metal layers 41, and part of each of the first semiconductor layers 28 are not covered with the interlayer insulating film 25. In this way, the reflection layers 40 are formed in regions that are located between the adjacent first pads 31 (gate terminals 17a) and include the edge of the interlayer insulating film 25.

Thereafter, the pixel electrodes 15 are formed by photolithography and etching. First, as shown in FIG. 4, a pixel electrode material 35 made of ITO, etc. is formed uniformly on the glass substrate 10 to cover the interlayer insulating film 25. Subsequently, a resist 36 is formed to cover the pixel electrode material 35, and then exposed to light via a photomask (not shown). Exposed portions of the resist 36 are then removed, thereby to form a mask of the resist 36 having openings corresponding to regions in which neither the pixel electrodes 15 nor the second pads 32 are formed.

Portions of the pixel electrode material 35 not covered with the mask of the resist 36 are then etched, to form the pixel electrodes 15 having a predetermined shape on the surface of the interlayer insulating film 25, and also form the second pads 32 on the surfaces of the first pads 31.

In the first embodiment, in the neighborhood of the edge of the interlayer insulating film 25, the exposure light having passed through the resist 36 is reflected by the reflection layers 40 in the direction opposite to the glass substrate 10. Thus, the portions of the resist 36 located above the reflection layers 40 are sufficiently exposed to light compared with the other portions.

Thereafter, an alignment film (not shown) is formed to cover the pixel electrodes 15 and the interlayer insulating film 25, thereby to fabricate the TFT substrate 11.

Advantages of First Embodiment

In the first embodiment, the reflection layers 40 are provided in regions that are located between the adjacent terminals 17a and include an edge of the interlayer insulating film 25, as viewed from the normal to the glass substrate 10. Therefore, exposure light having passed through the resist 36 in the neighborhood of the edge of the interlayer insulating film 25 is reflected by the reflection layers 40 in the direction opposite to the glass substrate 10, and thus the resist 36 can be sufficiently exposed to light in the regions where the reflection layers 40 are formed. In this way, generation of residues of the resist 36 can be prevented in the regions where the reflection layers 40 are formed.

Thus, as shown in FIG. 7, even if there exists a residue of the pixel electrode material 35 in a region that is located between adjacent terminals 17a and includes the edge of the interlayer insulating film 25, the resist 36 can be removed reliably in the region where the reflection layer 40 is formed, avoiding generation of a residue of the pixel electrode material 35 in this region. Therefore, since the residue of the pixel electrode material 35 existing between the terminals 17a is partitioned at the position above the reflection layer 40, short-circuiting between the adjacent terminals 17a can be suppressed or reduced in the neighborhood of the edge of the interlayer insulating film 25.

Also, since the reflection layers 40 can be thinned easily, unlike the case of forming extensions of the comparatively thick interlayer insulating film 25 between the adjacent terminals 17a, interference between the reflection layers 40 and an external circuit can be prevented, facilitating connection of the external circuit to the terminals 17a.

Moreover, since the reflection layers 40 can be formed of a metal layer, etc., they can be formed into a fine shape with high precision by photolithography, etc. even when the spacing between the adjacent terminals 17a is comparatively narrow. In other words, short-circuiting between the terminals 17a can be suitably suppressed or reduced even for the small-size liquid crystal display device 1 capable of high-resolution display and the TFT substrate 11 used for such a device.

Also, since the reflection layers 40 are formed in the layer different from the layer of the first pads 31, short-circuiting between the reflection layers 40 and the first pads 31 can be prevented reliably.

Therefore, for the TFT substrate 11 having the lines 17 and 18 and the terminals 17a placed with narrow spacing, also, short-circuiting between the terminals 17a can be suppressed or reduced, and connection of an external circuit to the terminals 17a can be facilitated. The first semiconductor layer 28 may be replaced with another high-resistance film, and in this case, also, similar advantages can be obtained.

Since the reflection layers 40 are formed on the gate insulating film 14, the step near the edge of the interlayer insulating film 25 can be made comparatively mild, permitting more efficient light exposure of the resist 36 by the reflection layers 40.

Although the second pads 32 are not essential, formation of the second pads 32 can suppress or reduce corrosion of the first pads 31.

With a spacing of about several micrometers to several tens of micrometers provided between the second pads 32 and the interlayer insulting film 25, leakage failure can be avoided from occurring, which may occur if conductive particles having a size of about several micrometers are lined along the edge of the interlayer insulating film 25 at the time of connection of an external circuit such as an FPC to the terminals 17a. Thus, a margin can be secured against a deviation that may occur at the time of connection of an external circuit such as an FPC.

Second Embodiment

Figure 8:
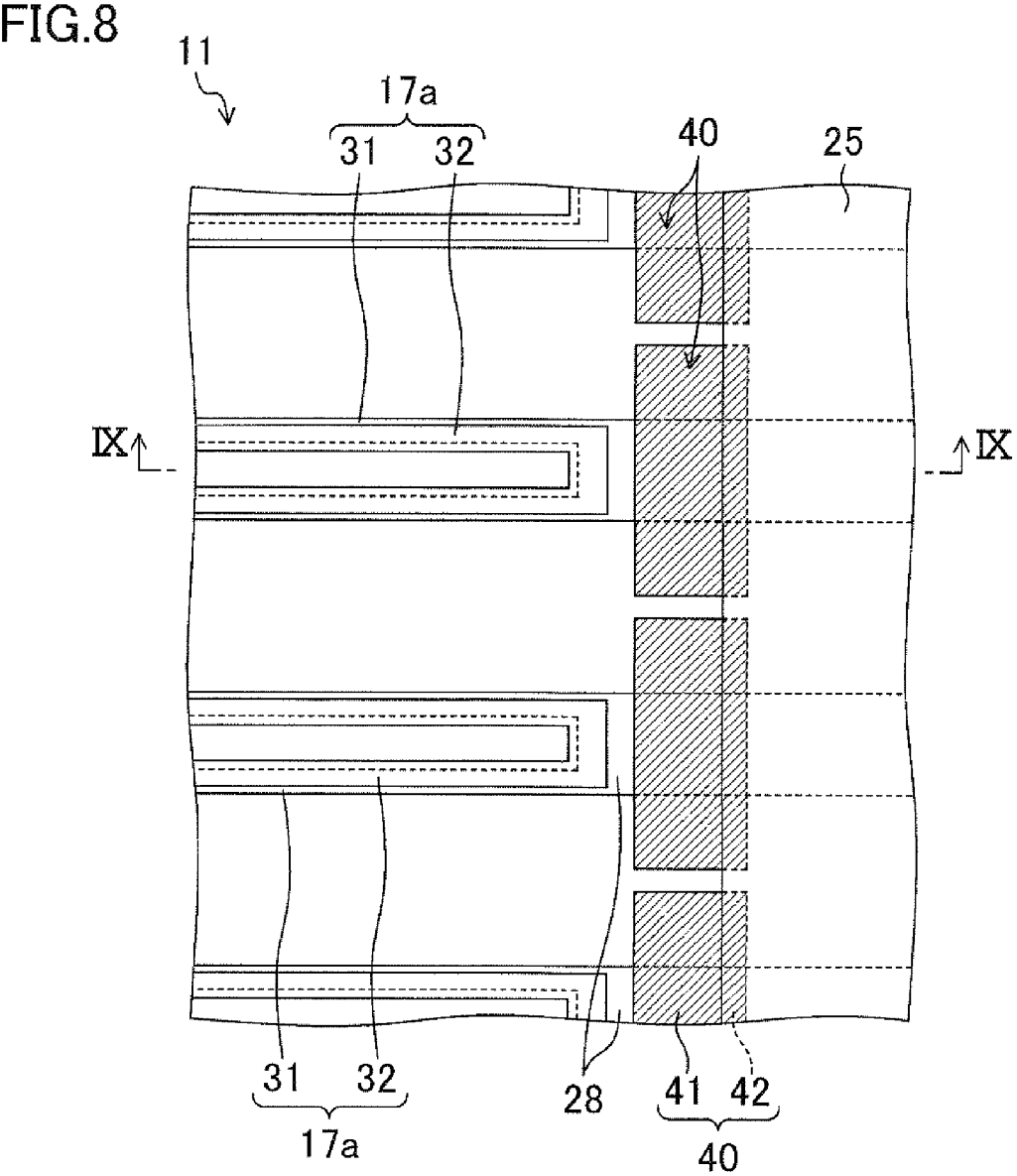
FIG. 8 is an enlarged plan view of part of a TFT substrate of the second embodiment.
Figure 9:
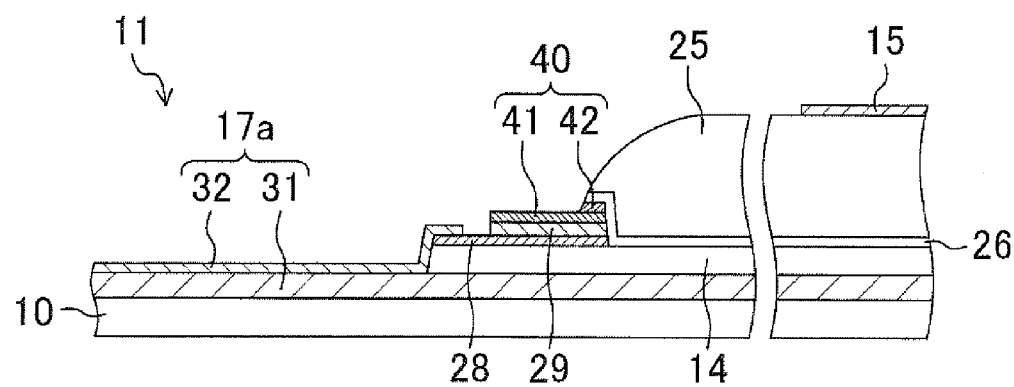
FIG. 9 is a cross-sectional view taken along line IX-IX in FIG. 8.

FIGS. 8 and 9 show the second embodiment of the present disclosure.

FIG. 8 is an enlarged plan view of part of a TFT substrate of the second embodiment, and FIG. 9 is a cross-sectional view taken along line IX-IX in FIG. 8. It should be noted that, in this and subsequent embodiments, the same components as those in FIGS. 1-6 are denoted by the same reference characters, and detailed description thereof is omitted.

While the reflection layers 40 are formed only between the adjacent terminals 17a in the first embodiment, the reflection layers 40 are formed also above the terminals 17a in the second embodiment.

That is, as shown in FIG. 8, the reflection layers 40 in the second embodiment are not only formed intermittently along the edge of the interlayer insulating film 25, as in the first embodiment, but also extend astride the terminals 17a along the width of the terminals 17a. The spacing between the adjacent reflection layers 40 is preferably 3 μm or more, for example. With this placement, a margin can be secured against a deviation that may occur at the time of connection of an external circuit such as an FPC.

As in the first embodiment, the first pads 31 are formed on the surface of the glass substrate 10 with a predetermined spacing, and the gate insulating film 14 is formed to cover part of each of the first pads 31. The gate insulating film 14 has a contact slit 33 formed therethrough, as shown in FIG. 8, to extend on the first pad 31 along the first pad 31. The second pad 32 formed on the gate insulating film 14 comes into contact with the first pad 31 via the contact slit 33.

The first semiconductor layer 28 is formed on the gate insulating film 14, and partly underlies the interlayer insulating film 25.

A second semiconductor layer 29 and the first metal layer 41 are stacked one upon the other on the surface of the first semiconductor layer 28, and partly underlie the interlayer insulating film 25. The second metal layer 42 is formed on the surface of the portion of the first metal layer 41 underlying the interlayer insulating film 25.

A portion of the protection film 26 rises from the gate insulating film 14 to sit on the surface of the second metal layer 42. In this way, as shown in FIG. 9, the sidewalls of the second metal layer 42, the protection film 26, and the interlayer insulating film 25 constitute one continuous sidewall as a whole.

The second pad 32 rises at its end from the first pad 31 to sit on the first semiconductor layer 28 at the end opposite to the end on which the protection film 26 sits.

In fabrication of the TFT substrate 11 in the second embodiment, after formation of the first semiconductor layers 28 and the second semiconductor layers 29 on the gate insulating film 14, the first metal layers 41 made of a Ti layer, for example, are formed on the second semiconductor layers 29. The second metal layers 42 made of an Al layer are then formed on portions of the first metal layers 41. As in the first embodiment, the second metal layers 42 are formed by photolithography and etching together with the protection film 26 and the interlayer insulating film 25.

Thereafter, as in the first embodiment, the pixel electrode material 35 made of ITO, etc. and the resist 36 are deposited uniformly, and the resist 36 is exposed to light. During the exposure, the exposure light having passed through the resist 36 is reflected by the reflection layers 40 in the neighborhood of the edge of the interlayer insulating film 25. Thus, the portions of the resist 36 located above the reflection layers 40 are sufficiently exposed to light compared with the other portions.

Thus, the pixel electrodes 15 are formed on the interlayer insulating film 25, and also the second pads 32 are formed on the first pads 31, thereby to fabricate the TFT substrate 11.

Advantages of Second Embodiment

In the second embodiment, also, the reflection layers 40 are partly placed between the adjacent terminals 17a. Therefore, as in the first embodiment, in the regions near the edge of the interlayer insulating film 25 where the reflection layers 40 are provided, generation of residues of the resist 36 and thus residues of the pixel electrode material 35 can be prevented. Thus, short-circuiting between the adjacent terminals 17a can be suppressed or reduced. In addition, since the reflection layers 40 can be thinned easily, connection of an external circuit to the terminals 17a can be facilitated.

Third Embodiment

Figure 10:
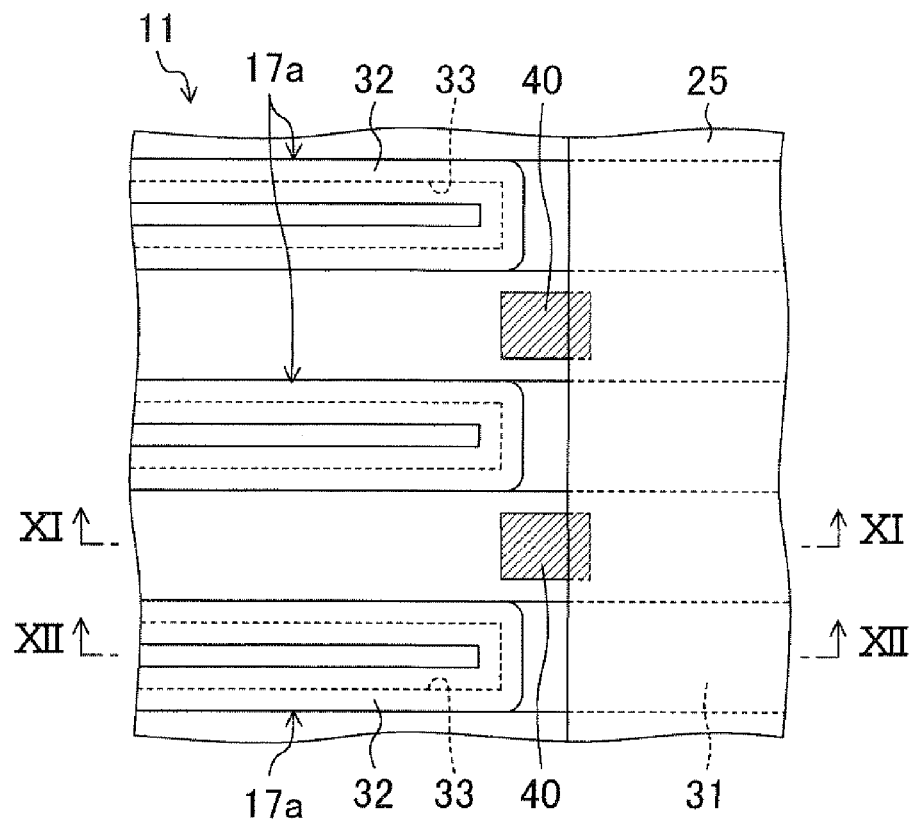
FIG. 10 is an enlarged plan view of part of a TFT substrate of the third embodiment.
Figure 11:
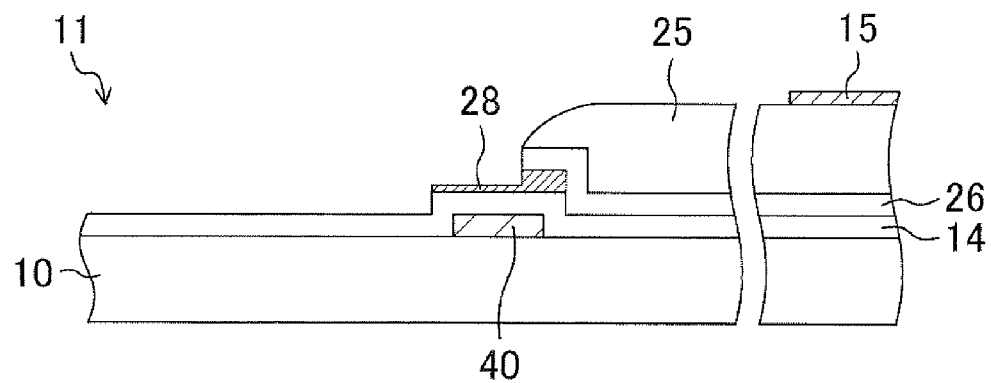
FIG. 11 is a cross-sectional view taken along line XI-XI in FIG. 10.
Figure 12:
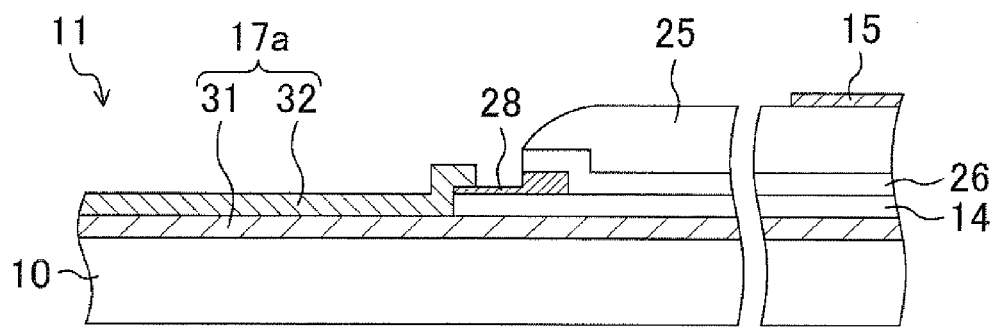
FIG. 12 is a cross-sectional view taken along line XII-XII in FIG. 10.

FIGS. 10-12 show the third embodiment of the present disclosure.

FIG. 10 is an enlarged plan view of part of a TFT substrate of the third embodiment, FIG. 11 is a cross-sectional view taken along line XI-XI in FIG. 10, and FIG. 12 is a cross-sectional view taken along line XII-XII in FIG. 10.

While the reflection layers 40 made of the same material as the source lines 18 are formed between the adjacent gate terminals 17a in the first embodiment, reflection layers 40 made of the same material as the gate lines 17 are formed between the adjacent gate terminals 17a in the third embodiment.

Each of the gate terminals 17a has a similar configuration to that in the first embodiment, which includes, as shown in FIGS. 10 and 12, the first pad 31 formed on the glass substrate 10 and the second pad 32 partly formed on the surface of the first pad 31. The first pad 31 is made of the same material as the gate lines 17, and the second pad 32 is made of the same material as the pixel electrodes 15, such as ITO. The second pad 32 comes into contact with the first pad 31 via the contact slit 33 formed through the gate insulating film 14.

The first semiconductor layer 28 is formed on the gate insulating film 14 in a region including the edge of the interlayer insulating film 25. The thickness of the first semiconductor layer 28 is 0.2 µm or less, for example. A portion of the protection film 26 rises from the gate insulating film 14 to sit on the surface of the first semiconductor layer 28. The interlayer insulating film 25 made of an organic film, for example, is formed on the surface of the protection film 26 to a comparatively large thickness (e.g., about 1 to 4 µm).

The second pad 32 rises at its end from the first pad 31 to sit on the first semiconductor layer 28 at the end opposite to the end on which the protection film 26 sits. The spacing between the second pad 32 and the interlayer insulating film 25 is about several micrometers to several tens of micrometers.

As shown in FIGS. 10 and 11, the reflection layer 40 that reflects light is provided in a region that is at least part of each gap between the adjacent gate terminals 17a and includes the edge of the interlayer insulating film 25, as viewed from the normal to the surface of the glass substrate 10.

The reflection layers 40 in the third embodiment are made of the same material as the gate lines 17, and, as shown in FIG. 11, are formed on the surface of the glass substrate 10 and covered with the gate insulating film. 14. Also, the reflection layers 40 are placed independently between the adjacent gate terminals 17a so as not to overlap the gate terminals 17a.

In fabrication of the liquid crystal display device 1 having the TFT substrate 11 described above, a metal layer made of Ti, Al, and TiN layers, for example, formed on the glass substrate 10 is subjected to photolithography and etching, to form the gate lines 17, the first pads 31, and the reflection layers 40 simultaneously in the same process.

The metal layer is not limited to the Ti, Al, and TiN multilayer film, but may be a metal layer having Cr or Mo and Al or an Al-containing alloy layered in this order, or a single-layer metal layer made of Al or an Al-containing alloy. It is preferred to place the Al layer high in reflectivity as the uppermost layer from the standpoint of further enhancement of the reflection effect of the reflection layers 40.

Thereafter, the gate insulating film 14 is formed to cover the gate lines 17, the first pads 31, and the reflection layers 40. The first semiconductor layers 28 are then formed on the gate insulating film 14, and the contact slits 33 are formed through the gate insulating film 14. Subsequently, as in the first embodiment, the protection film 26 and the interlayer insulating film 25 are formed on the gate insulating film 14.

The pixel electrodes 15 are then formed by photolithography and etching. More specifically, as in the first embodiment, the pixel electrode material 35 made of ITO, etc. is deposited on the entire surface of the glass substrate 10 to cover the interlayer insulating film 25, and then the resist 36 is formed to cover the entire of the pixel electrode material 35 (see FIG. 4). The resist 36 is then exposed to light via a photomask (not shown) and developed, to form a mask of the resist 36.

Thereafter, portions of the pixel electrode material 35 not covered with the mask of the resist 36 are removed by etching, to form the pixel electrodes 15 having a predetermined shape on the surface of the interlayer insulating film 25 and also form the second pads 32 on the surface of the first pads 31.

In the third embodiment, in the neighborhood of the edge of the interlayer insulating film 25, exposure light having passed through the resist 36, the first semiconductor layers 28, and the gate insulating film 14 is reflected by the reflection layers 40. Thus, the portions of the resist 36 located above the reflection layers 40 are sufficiently exposed to light compared with the other portions. In this way, the TFT substrate 11 is fabricated.

Advantages of Third Embodiment

In the third embodiment, also, the reflection layers 40 are provided in regions that are located between the adjacent terminals 17a and include the edge of the interlayer insulating film 25, as viewed from the normal to the surface of the glass substrate 10. Therefore, since the portions of the resist 36 in the neighborhood of the edge of the interlayer insulating film 25, where the reflection layers 40 are provided, can be subjected to sufficient light exposure with the light reflected by the reflection layers 40, advantages similar to those in the first embodiment can be obtained.

In addition, since the entire reflection layers 40 are covered with the gate insulating film 14, electrical short-circuiting via the reflection layers 40 can be prevented even if another member such as an external circuit comes into contact with the reflection layers 40.

Fourth Embodiment

Figure 13:
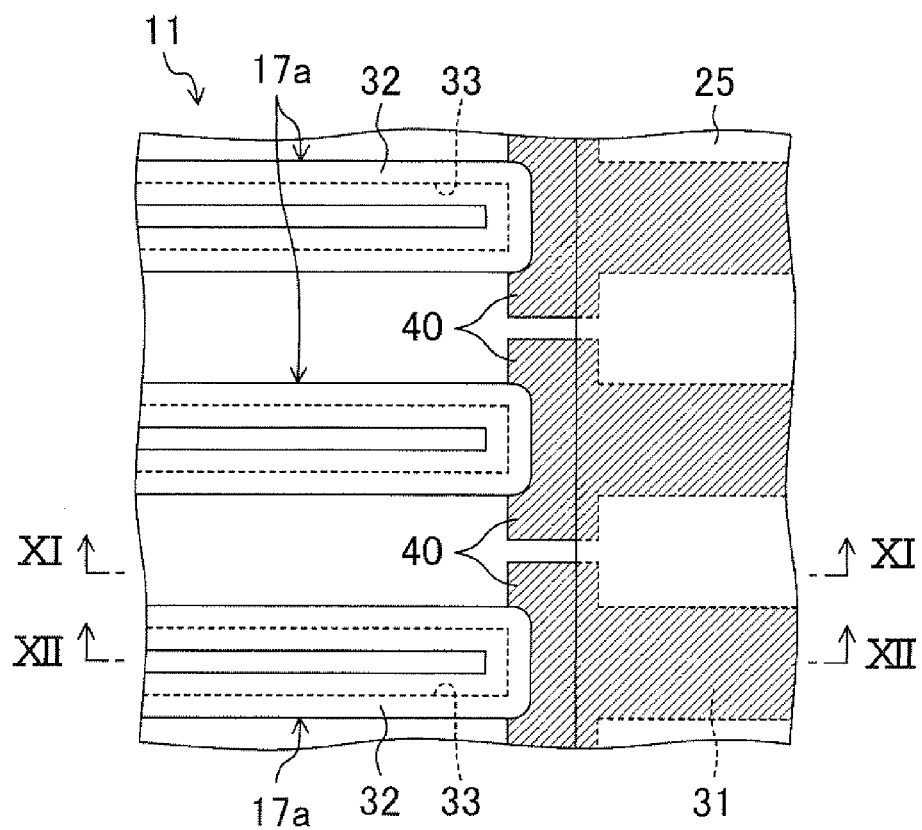
FIG. 13 is an enlarged plan view of part of a TFT substrate of the fourth embodiment.

FIG. 13 shows the fourth embodiment of the present disclosure.

FIG. 13 is an enlarged plan view of part of a TFT substrate of the fourth embodiment. Note that the cross-sectional view taken along line XI-XI in FIG. 13 corresponds to FIG. 11, and the cross-sectional view taken along line XII-XII in FIG. 13 corresponds to FIG. 12.

While the reflection layers 40 are formed like islands between the adjacent terminals 17a in the third embodiment, the reflection layers 40 are formed integrally with the gate terminals 17a in the fourth embodiment.

More specifically, as shown in FIG. 13, the reflection layers 40 are formed integrally with the first pads 31, and protrude from the opposite sides of the gate terminals 17a in the width direction to extend along the edge of the interlayer insulating film 25 in a region including the edge. The adjacent reflection layers 40 are spaced from each other.

Advantages of Fourth Embodiment

In the fourth embodiment, also, since the reflection layers 40, entirely covered with the gate insulating film 14, are placed between the adjacent gate terminals 17a, advantages similar to those in the third embodiment can be obtained.

Fifth Embodiment

Figure 14:
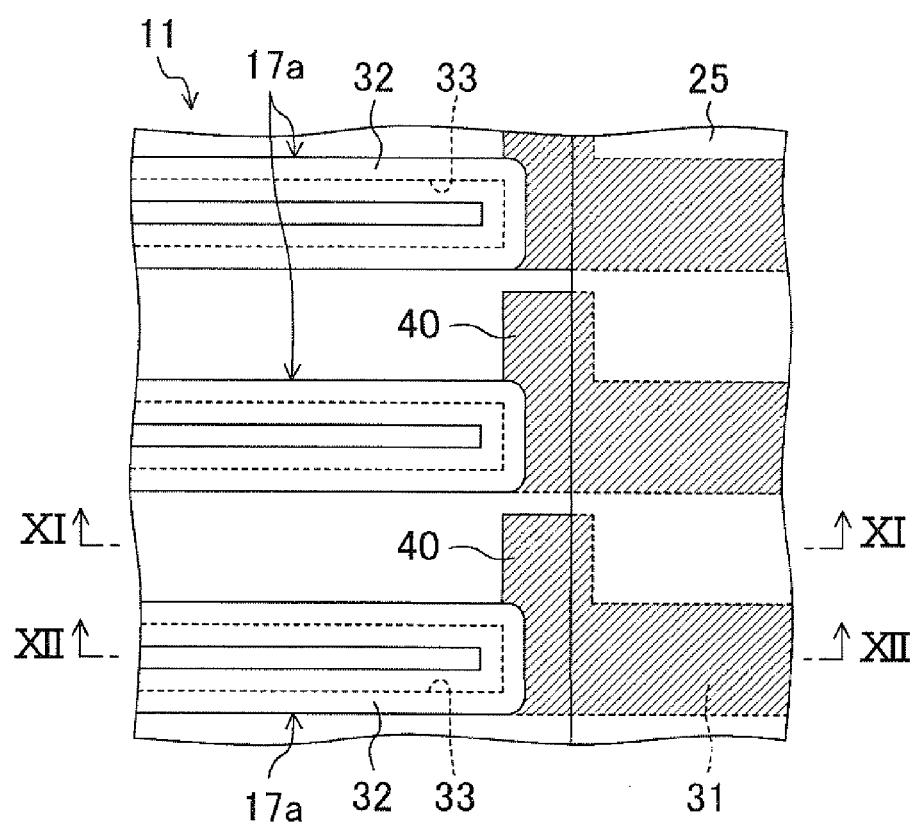
FIG. 14 is an enlarged plan view of part of a TFT substrate of the fifth embodiment.

FIG. 14 shows the fifth embodiment of the present disclosure.

FIG. 14 is an enlarged plan view of part of a TFT substrate of the fifth embodiment. Note that the cross-sectional view taken along line XI-XI in FIG. 14 corresponds to FIG. 11, and the cross-sectional view taken along line XII-XII in FIG. 14 corresponds to FIG. 12.

While the reflection layers 40 are formed to protrude from the opposite sides of the gate terminals 17a in the width direction in the fourth embodiment, the reflection layers 40 are formed to protrude from one side of the gate terminals 17a in the width direction in the fourth embodiment.

Advantages of Fifth Embodiment

In the fifth embodiment, also, since the reflection layers 40, entirely covered with the gate insulating film 14, are placed between the adjacent gate terminals 17a, advantages similar to those in the third embodiment can be obtained.

Sixth Embodiment

Figure 15:
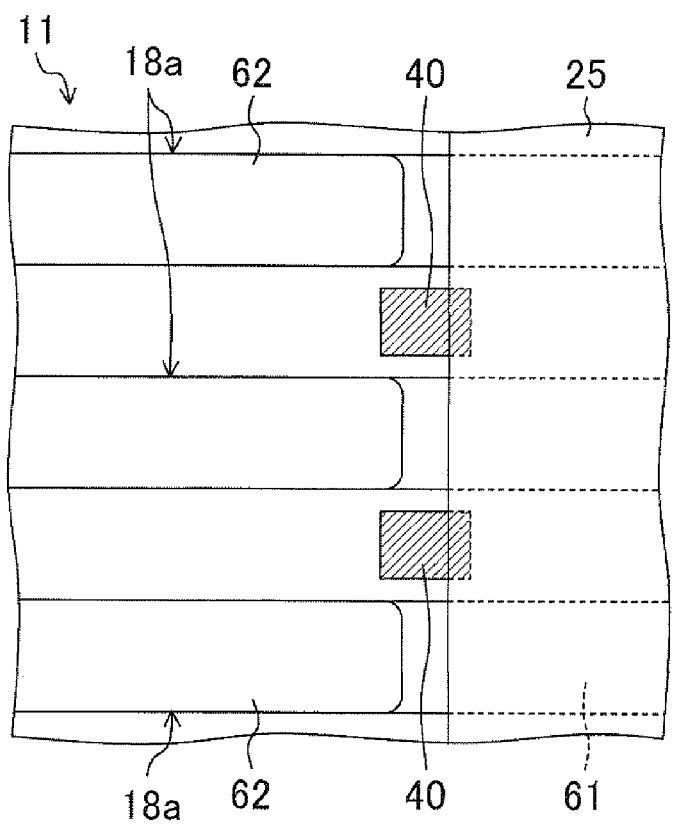
FIG. 15 is an enlarged plan view of part of a TFT substrate of the sixth embodiment.

FIG. 15 shows the sixth embodiment of the present disclosure.

FIG. 15 is an enlarged plan view of part of a TFT substrate of the sixth embodiment.

While the reflection layers 40 made of the same material as the source lines 18 are formed between the adjacent gate terminals 17a in the first embodiment, reflection layers 40 made of the same material as the gate lines 17 are formed between the adjacent source terminals 18a in the sixth embodiment.

As shown in FIG. 15, like the gate terminals 17a, each of the source terminals 18a includes a first pad 61 formed on the glass substrate 10 and a second pad 62 partly formed on the first pad 61.

The first pad 61 is made of the same material as the source lines 18, such as a metal layer of Al, etc. The second pad 62 is made of the same material as the pixel electrodes 15, such as ITO, and extends along the first pad 61.

A gate insulating film (not shown) is formed above the glass substrate 10 to cover the first pad 61. The gate insulating film has a contact slit formed therethrough to extend on the first pad 31 along the first pad 31. The second pad 62 formed on the gate insulating film come into contact with the first pad 61 via the contact slit.

As in the first embodiment, a first semiconductor layer (not shown) is formed on the gate insulating film in a region including an edge of the interlayer insulating film 25. A portion of a protection film (not shown) rises from the gate insulating film to sit on the surface of the first semiconductor layer. The second pad 62 rises at its end from the first pad 61 to sit on the surface of the first semiconductor layer at the end opposite to the end on which the protection film sits.

As shown in FIG. 15, the reflection layer 40 that reflects light is provided in a region that is at least part of each gap between the adjacent source terminals 18a and includes the edge of the interlayer insulating film 25, as viewed from the normal to the surface of the glass substrate 10.

As in the third embodiment, the reflection layers 40 in the sixth embodiment are made of the same material as the gate lines 17 and formed on the surface of the glass substrate 10. The reflection layers 40 are also covered with the gate insulating film. Moreover, the reflection layers 40 are placed independently between the adjacent source terminals 18a so as not to overlap the source terminals 18a.

In fabrication of the liquid crystal display device 1 having the TFT substrate 11 described above, as in the third embodiment, the gate lines 17 and the reflection layers 40 are formed simultaneously in the same process. Thereafter, the gate insulating film is formed to cover the gate lines 17 and the reflection layers 40. The first semiconductor layers are then formed on the gate insulating film, and the contact slits are formed through the gate insulating film. Subsequently, as in the first embodiment, the protection film and the interlayer insulating film 25 are formed on the gate insulating film.

Thereafter, as in the third embodiment, the pixel electrodes 15 are formed by photolithography and etching. More specifically, the pixel electrode material 35 and the resist 36 are deposited in this order on the entire surface of the glass substrate 10, and then the resist 36 is exposed to light and developed, to form a photomask.

During the above light exposure, in the neighborhood of the edge of the interlayer insulating film 25, exposure light having passed through the resist 36, etc. is reflected by the reflection layers 40. Thus, the portions of the resist 36 located above the reflection layers 40 are sufficiently exposed to light compared with the other portions.

Advantages of Sixth Embodiment

In the sixth embodiment, also, the reflection layers 40 are placed in regions that are located between the adjacent source terminals 18a and include the edge of the interlayer insulating film 25, as viewed from the normal to the surface of the glass substrate 10. Therefore, since the portions of the resist 36 in the neighborhood of the edge of the interlayer insulating film 25, where the reflection layers 40 are provided, can be subjected to sufficient light exposure with the light reflected by the reflection layers 40, advantages similar to those in the first embodiment can be obtained.

In addition, since the entire reflection layers 40 are covered with the gate insulating film, electrical short-circuiting via the reflection layers 40 can be prevented even if another member such as an external circuit comes into contact with the reflection layers 40.

Seventh Embodiment

Figure 16:
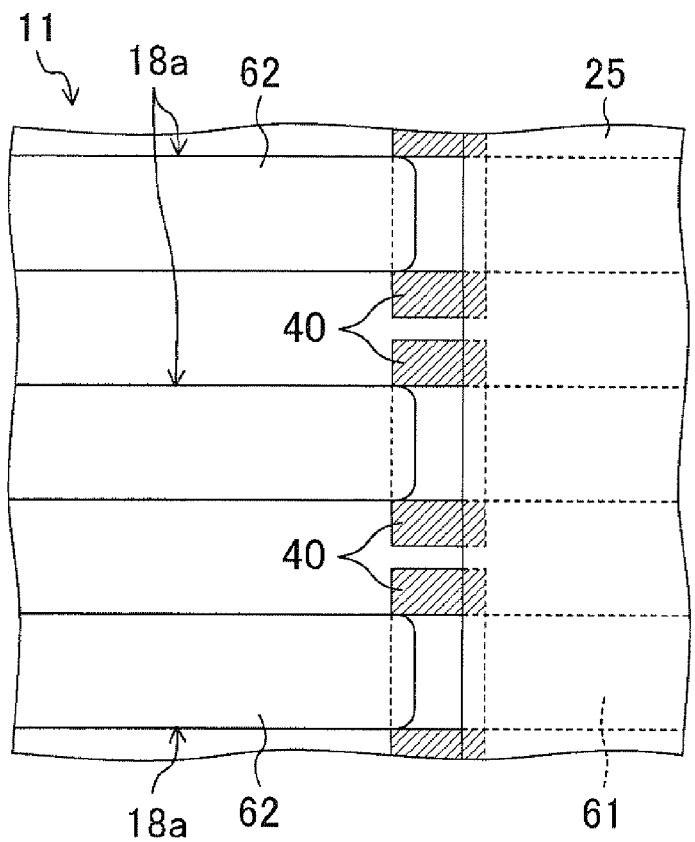
FIG. 16 is an enlarged plan view of part of a TFT substrate of the seventh embodiment.

FIG. 16 shows the seventh embodiment of the present disclosure.

FIG. 16 is an enlarged plan view of part of a TFT substrate of the seventh embodiment.

While the reflection layers 40 are formed like islands between the adjacent source terminals 18a in the sixth embodiment, island-like reflection layers 40 are formed to extend under the first pads 61 in the seventh embodiment.

More specifically, as shown in FIG. 16, the reflection layers 40 are placed along the edge of the interlayer insulating film 25 with a predetermined spacing. Each of the reflection layers 40 intersects the first pad 61 of the corresponding source terminal 18a. Thus, the reflection layers 40 are formed to protrude from the opposite sides of the source terminals 18a in the width direction as view from the normal to the glass substrate 10.

Advantages of Seventh Embodiment

In the seventh embodiment, also, the reflection layers 40 are placed in regions that are located between the adjacent source terminals 18a and include the edge of the interlayer insulating film 25, as viewed from the normal to the surface of the glass substrate 10. Therefore, since the portions of the resist 36 in the neighborhood of the edge of the interlayer insulating film 25 can be subjected to sufficient light exposure with the light reflected by the reflection layers 40, advantages similar to those in the first embodiment can be obtained.

In addition, since the entire reflection layers 40 are covered with the gate insulating film, electrical short-circuiting via the reflection layers 40 can be prevented even if another member such as an external circuit comes into contact with the reflection layers 40.

Eighth Embodiment

Figure 17:
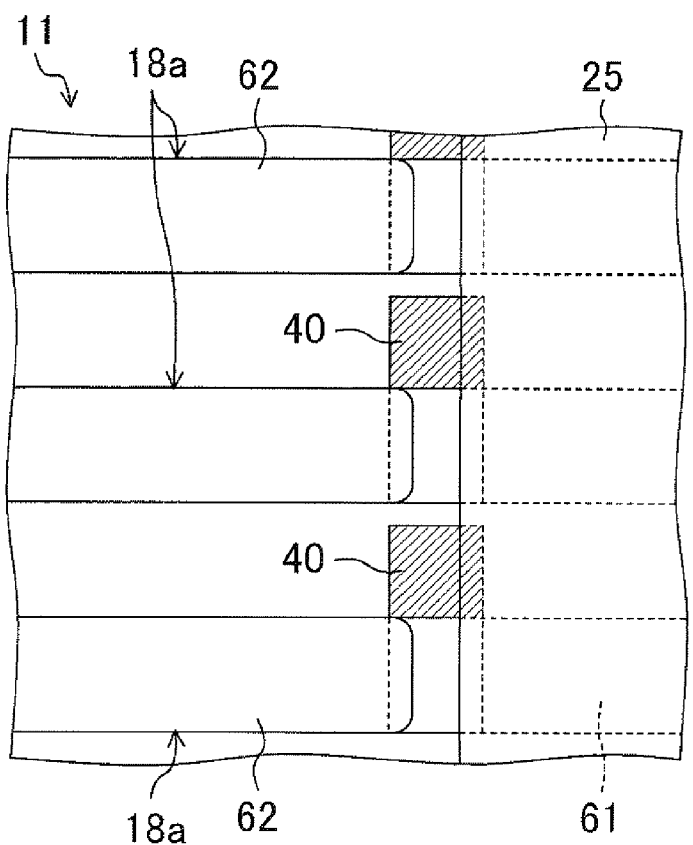
FIG. 17 is an enlarged plan view of part of a TFT substrate of the eighth embodiment.
Figure 18:
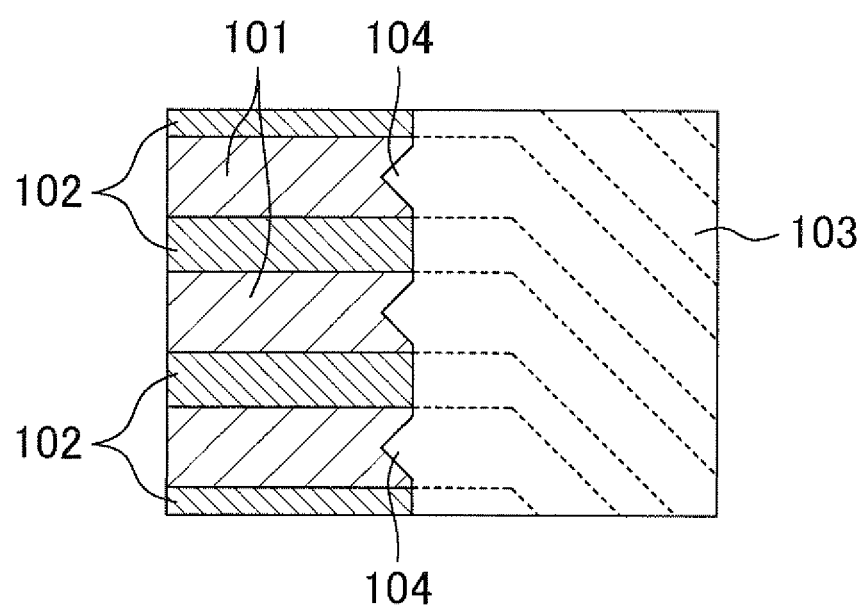
FIG. 18 is an enlarged plan view of part of a conventional active matrix substrate.

FIG. 17 shows the eighth embodiment of the present disclosure.

FIG. 17 is an enlarged plan view of part of a TFT substrate of the eighth embodiment.

While the reflection layers 40 are placed to protrude from the opposite sides of the source terminals 18a in the width direction in the seventh embodiment, the reflection layers 40 are placed to protrude from one side of the source terminals 18a in the width direction in the eighth embodiment.

More specifically, as shown in FIG. 17, the reflection layers 40 are placed along the edge of the interlayer insulating film 25 with a predetermined spacing. Each of the reflection layers 40 partly underlies the corresponding first pad 61 and protrudes from one side of the first pad 61 in the direction along the edge of the interlayer insulating film 25. A predetermined spacing is given between the protruding end of the reflection layer 40 and the adjacent source terminal 18a.

Advantages of Eighth Embodiment

In the eighth embodiment, also, since the reflection layers 40, entirely covered with the gate insulating film 14, are placed between the adjacent source terminals 18a, advantages similar to those in the seventh embodiment can be obtained.

Other Embodiments

In the above embodiments, the TFT substrate 11 having a plurality of TFTs was described as an example. The present disclosure is not limited to this, but an active matrix substrate having other switching elements such as TFDs, for example, may be used.

In the above embodiments, the terminals to which an external circuit is to be connected were described. Alternatively, the present disclosure can also be applied to other terminals such as terminals for input of test signals.

The external circuit is not limited to one for supplying signals, but may be a circuit for reading signals. That is, circuits such as an X-ray sensor and a touch panel may be used.

The terminals in the present disclosure are not limited to the gate terminals and the source terminals, but may be terminals for input of a counter signal into the common electrode of the counter substrate 12, terminals for input of a power supply signal into a drive circuit formed monolithically on the active matrix substrate, etc.

In the above embodiments, the reflection layer 40 was provided in every gap between the adjacent terminals. The present disclosure is not limited to this, but the reflection layer may be provided in at least one gap between adjacent terminals. However, from the standpoint of ensuring prevention of short-circuiting between terminals, it is preferable to provide the reflection layer 40 in every gap between the adjacent terminals.

In the sixth to eighth embodiments described above, the reflection layers 40 made of the same material as the gate lines 17 were placed between the adjacent source terminals 18a. Alternatively, reflection layers 40 made of the same material as the source lines 18 may be placed between the adjacent source terminals 18a. In this case, also, advantages similar to those in the first embodiment can be obtained.

In the third to eighth embodiments described above, the entire reflection layers 40 were covered with the gate insulating film 14. The present disclosure is not limited to this but the entire reflection layers 40 may be covered with another insulating film.

In the embodiments described above, the liquid crystal display device 1 was described as an example. Alternatively, the present disclosure can also be applied to other display devices such as an organic EL display device whose display medium layer is a light emitting layer.

Industrial Applicability

As described above, the present disclosure is useful in an active matrix substrate and a display device having the same.

DESCRIPTION OF REFERENCE CHARACTERS

1 Liquid Crystal Display Device
10 Glass Substrate (Insulating Substrate)
11 TFT Substrate (Active Matrix Substrate)
12 Counter Substrate
13 Liquid Crystal Layer (Display Medium Layer)
14 Gate Insulating Film (Insulating Film)
15 Pixel Electrode
17 Gate Line
17a Gate Terminal
18 Source Line
18a Source Terminal
19 TFT (Switching Element)
25 Interlayer Insulating Film
28 First Semiconductor Layer
29 Second Semiconductor Layer
31 First Pad (Terminal)
32 Second Pad (Terminal)
35 Pixel Electrode Material
36 Resist
40 Reflection Layer
41 First metal Layer (Reflection Layer)
42 Second metal Layer (Reflection Layer)

The invention claimed is:

1. An active matrix substrate, comprising:
   an insulating substrate;
   a plurality of switching elements provided on the insulating substrate;
   a plurality of lines provided on the insulating substrate and connected to the switching elements;
   an interlayer insulating film covering the plurality of switching elements and the plurality of lines;
   a plurality of pixel electrodes formed on the interlayer insulating film; and
   a plurality of terminals connected to the plurality of lines and placed with a predetermined spacing,
   wherein
   at least part of each of the plurality of terminals is not covered with the interlayer insulating film,
   a reflection layer configured to reflect light in a direction opposite to the insulating substrate is provided in a region that is at least part of each gap between the adjacent terminals and includes an edge of the interlayer insulating film, as viewed from the normal to the surface of the insulating substrate, and
   a semiconductor layer partially overlapping the interlayer insulating film is provided in a region corresponding to the reflection layer and including the edge of the interlayer insulating film as viewed from the normal to the surface of the insulating substrate.

2. The active matrix substrate of claim 1, wherein the reflection layer is placed independently in each gap between the adjacent terminals.

3. The active matrix substrate of claim 1, wherein the reflection layer is formed to extend astride each of the terminals in a width direction of the terminal.

4. The active matrix substrate of claim 1, wherein the reflection layer is made of a metal layer.

5. The active matrix substrate of claim 1, wherein an external circuit is connected to the plurality of terminals.

6. The active matrix substrate of claim 1, wherein the entire reflection layer is covered with an insulating film.

7. A display device comprising:
   an active matrix substrate;
   a counter substrate opposed to the active matrix substrate; and
   a display medium layer provided between the active matrix substrate and the counter substrate,
   wherein
   the active matrix substrate includes an insulating substrate, a plurality of switching elements provided on the insulating substrate, a plurality of lines provided on the insulating substrate and connected to the switching elements, an interlayer insulating film covering the plurality of switching elements and the plurality of lines, a plurality of pixel electrodes formed on the interlayer insulating film, and a plurality of terminals connected to the plurality of lines and placed with a predetermined spacing,
   at least part of each of the plurality of terminals is not covered with the interlayer insulating film,
   a reflection layer configured to reflect light in a direction opposite to the insulating substrate is provided in a region that is at least part of each gap between the adjacent terminals and includes an edge of the interlayer insulating film, as viewed from the normal to the surface of the insulating substrate, and
   a semiconductor layer partially overlapping the interlayer insulating film is provided in a region corresponding to the reflection layer and including the edge of the interlayer insulating film as viewed from the normal to the surface of the insulating substrate.

8. The display device of claim 7, wherein the reflection layer is placed independently in each gap between the adjacent terminals.

9. The display device of claim 7, wherein the reflection layer is formed to extend astride each of the terminals in a width direction of the terminal.

10. The display device of claim 7, wherein the reflection layer is made of a metal layer.

11. The display device of claim 7, wherein an external circuit is connected to the plurality of terminals.

12. The display device of claim 7, wherein the entire reflection layer is covered with an insulating film.

13. The display device of claim 7, wherein the display medium layer is a liquid crystal layer.

* * * * *